May 25, 1948.   A. B. LUTHER   2,442,136
MAGNETIC CHUCK ADAPTER
Filed Jan. 17, 1944   3 Sheets-Sheet 1
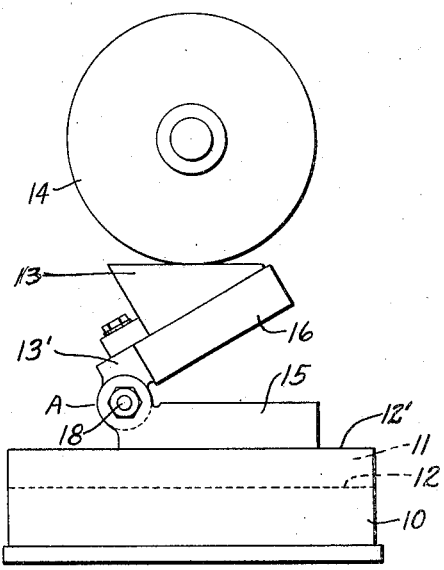
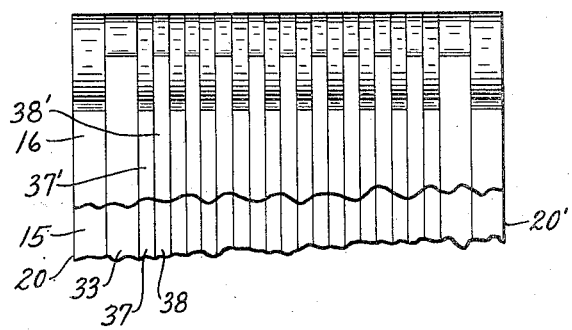

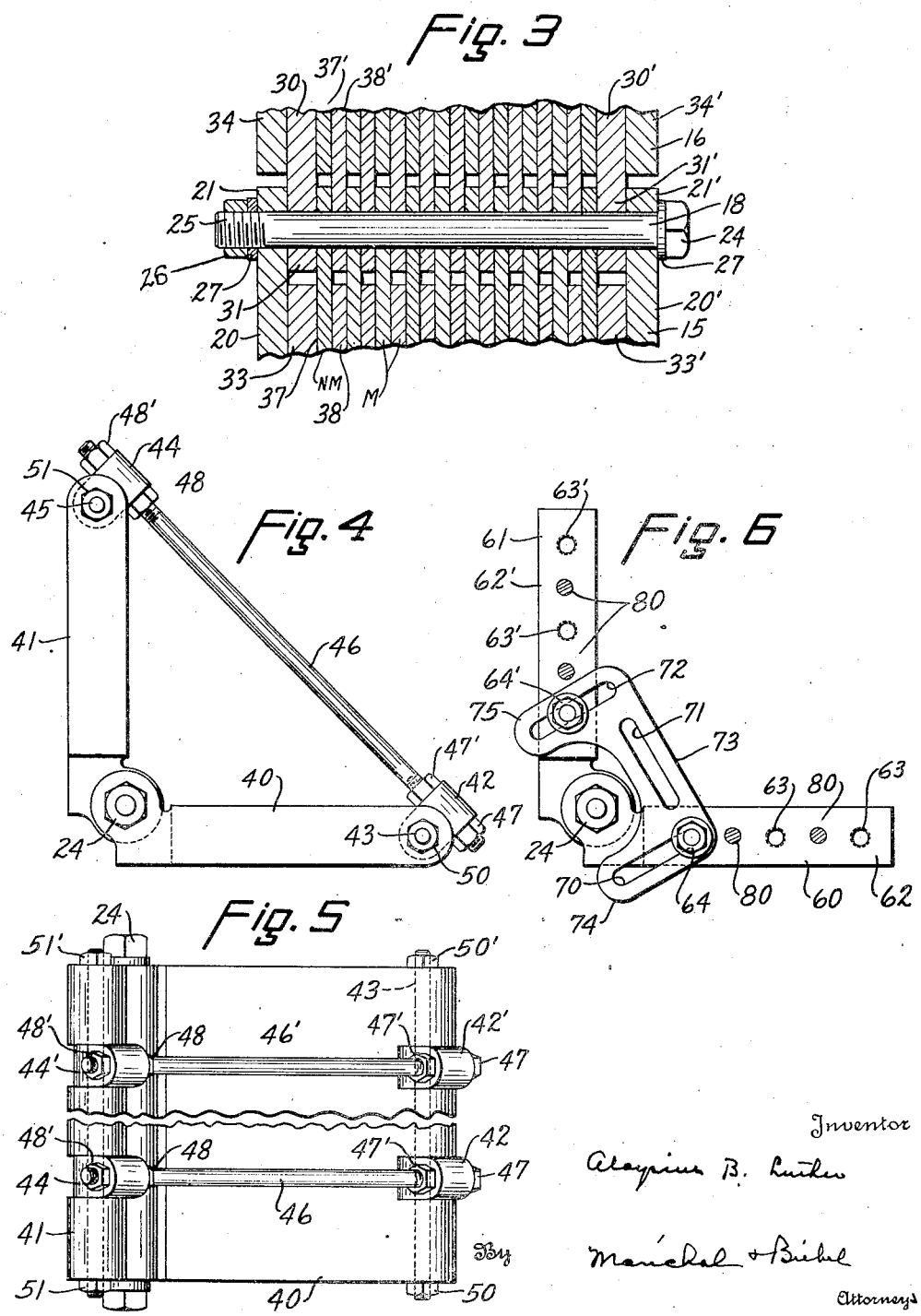

May 25, 1948.  A. B. LUTHER  2,442,136
MAGNETIC CHUCK ADAPTER
Filed Jan. 17, 1944  3 Sheets-Sheet 3

Inventor
Aloysius B. Luther
By Marechal & Biebel
Attorney

Patented May 25, 1948

2,442,136

UNITED STATES PATENT OFFICE 2,442,136

MAGNETIC CHUCK ADAPTER

Aloysius B. Luther, Dayton, Ohio

Application January 17, 1944, Serial No. 518,509

17 Claims. (Cl. 175—367)

This invention relates to adapters for magnetic chucks and more particularly to an adapter which is adjustable to provide a wide range of angular adjustment.

One of the principal objects of the invention is to provide such an adapter which is simple and compact in construction, easily and cheaply constructed, and which is nevertheless very effective and which may be easily and readily adjusted and held in adjusted angular position.

Another object of the invention is to provide such an adjustable magnetic chuck adapter which is effective in operation and not only permits of ready and accurate adjustment, but which will maintain the desired adjustment with accuracy to permit the desired precision in the machining or other operations.

Still another object is to provide means for accurate and maintained proper adjustment of hinged work holding members which is simple in construction, which permits accurate setting to the desired adjustment and which is effective to maintain adjustment for the demands of accurate workmanship.

Other objects and advantages of the invention will be apparent from the description and claims and the accompanying drawing.

In the drawing, in which like characters of reference designate like parts throughout the several views thereof—

Fig. 1 is a side elevation of a magnetic chuck illustrated somewhat diagrammatically, with an adapter embodying this invention positioned in place thereon, and with a piece of work shown in place thereon, in diagrammatic fashion;

Fig. 2 is a fragmentary plan view of the adapter, with parts broken away, to show in greater detail the construction;

Fig. 3 is a fragmentary sectional view through the axis of the adjusting bolt of the adapter shown in Figs. 1 and 2, showing the arrangement of parts at the hinged portion;

Fig. 4 is a side elevational view of a modified form of construction in which the chuck is provided with means in addition to the hinged adjustment portion, for effecting accurate and maintained angular adjustment of the parts;

Fig. 5 is a plan view of Fig. 4 showing the location and arrangement of certain of the parts in greater detail;

Fig. 6 is a side elevational view of still another modified form of construction showing a modified form of means including an adjustable and holding plate for effecting and maintaining accurate angular adjustment setting of the parts;

Figure 7:
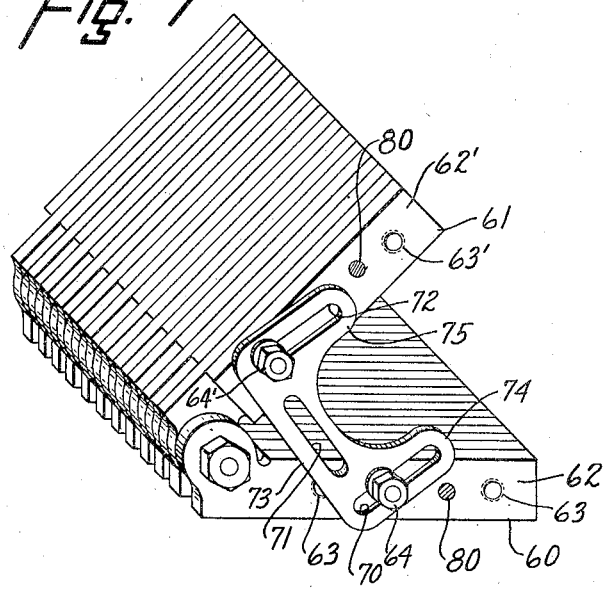
Fig. 7 is a view in the nature of a perspective of the adapter, this view showing the adjusting and locking means illustrated in Fig. 6 but oppositely positioned.

Magnetic chucks are well known and widely used in industry, and are constructed to provide a suitably powerful magnetic field to hold pieces of metal so that they may be machined without the necessity of complicated or expensive equipment for holding them for the particular machining, grinding or other operation to be performed.

Also adapters for these magnetic chucks are known. These adapters are so made as to provide a similar work-holding magnetic field and are constructed of magnetic portions so insulated as to permit of extending the desired holding magnetic flux through the adapter to be effective upon the work. In the preferred embodiment of the invention as herein illustrated the parts of the adapter are made of alternate parts or strips of magnetic and non-magnetic material, such as narrow strips of steel or other magnetic bars alternating with non-magnetic spacing strips or bars, such as copper or brass, and these are so arranged that they can hold work pieces in a variety of special or desired positions to supplement or extend the action of the magnetic chuck itself. Applicant has produced commercially such magnetic chuck adapters or blocks, both flat adapters merely to build up the chuck for varying sizes and thicknesses of parts in operations and also solid blocks having varying angular grooves for holding parts fitting into such grooves in the adapter at the particular angle of the block selected without the necessity of providing means for adjusting the chuck itself. So far as known, however, no one heretofore has provided a magnetic chuck adapter which is so constructed that it can be simply and readily adjusted to give a wide range of angular settings, which will be quite as effective as other chucks or chuck adapters, which can be readily and accurately adjusted and maintained in the setting desired and which is compact so that it will occupy small space while giving desired angular adjustment and rugged and rigid construction.

In the drawing, which illustrates the preferred embodiment of the invention, a magnetic chuck of the character heretofore used is illustrated conventionally by the numeral 10. The upper portion of this magnetic chuck, designated 11, is constructed to transmit suitable magnetic flux to hold the work piece 13 and is composed of magnetic metal which is magnetically insulated by non-magnetic material. This portion 11 may suitably consist of parts made of magnetic material and parts of associated non-magnetic material, such as copper or brass, to insulate the respective pole parts from each other. The dotted line 12 indicates the lower face of this composite portion 11, the upper face 12' serving as a surface for receiving the parts to be worked upon and for transmitting the magnetic flux which holds the work piece in proper position for the machining or other operation, and also for receiving and holding in operative position the adapter, designated generally by the letter A in Fig. 1. The work piece is illustrated diagrammatically at 13, and 14 designates a grinding wheel as a form of work tool.

In the form of apparatus herein illustrated the adapter comprises two generally similar parts 15 and 16, which are movably connected to each other, somewhat in the fashion of two parts of a hinge, by means of a rod 18. Each of the parts 15 and 16 is shown as composed of strips of magnetic material such as steel, which strips are illustrated in Figs. 2, 3 and 6 by the parts marked M and M, and are illustrated in section in Fig. 3, the non-magnetic insulating strips being initialed generally by the letters NM and in Fig. 3 shown as brass or copper. As illustrated in detail in Fig. 3 alternate strips, both the magnetic strips M and the non-magnetic strips NM, in each of the parts 15 and 16, extend beyond the one edge of each part 15 and 16 to form magnetic connections between parts 15 and 16 and provide associated hinge parts.

As shown in the several embodiments each of the hinged parts, designated generally 15 and 16, comprises comparatively thick end plates, which are of magnetic metal and act as end plates which can be connected together by means of non-magnetic rods or rivets to hold the other magnetic and non-magnetic strips of the adapter together with sufficient firmness and rigidity, if desired hydraulic pressure being applied so that the parts may be so rigidly held together as to act as if of solid metal. The two end plates 20 and 20', which are upon the portion 15 of the adapter carry extended portions 21 and 21' each of which has a transverse passage therethrough to receive the hinge pin 18, which is shown in Fig. 3 as a bolt of non-magnetic material having a head 24 and a threaded end 25 which receives a nut 26 which may be screwed down tightly against a washer or lock washer 27 to pull the various hinged portions or extensions so tightly together, after adjusting the desired angular positioning of parts 15 and 16, as to give adequate frictional resistance to hold the parts in firm workable setting for use during operation. A washer 27 is also interposed between the head of the bolt 24 and the end plate 20'; and if desired a hinge pin which is threaded upon both ends may be used, with cooperating nuts and washers so that by loosening one or both nuts the frictional resistance may be reduced to permit regular angular setting of the parts 15 and 16 with respect to each other and by proper tightening the frictional resistance may be increased to hold them workably tight in the desired adjusted position.

The part 16 is also provided with two thicker and stronger plates numbered 30 and 30' which likewise have the hinged extensions 31 and 31', similar to the plates 20—20' and extensions 21 and 21' which likewise receive the hinge pin. In order to compensate for thickness of 30 and 30' and to add stability, and provide additional magnetic material, shorter filler pieces 33 and 33' are positioned along and inside the two end plates 20 and 20', and they are of the same thickness as the parts 30—30' so that the remaining magnetic and non-magnetic thinner parts positioned in between the two ends may be adequately compressed and held in operative position. Likewise similarly shorter filler plates 34 and 34' are mounted outside the end hinge plates 30—30' and in line with the end plates 20 and 20', for the same reasons.

Between the plates 30—30' and 33—33' are alternate strips or layers of non-magnetic and magnetic material indicated by the letters NM and M respectively and, as stated, these parts are shown in cross section in Fig. 3. Very satisfactory results as to non-magnetic qualities and also as to physical strength may be attained through the use of copper or brass, although other non-magnetic materials of adequate strength and ability to withstand usage in like operations may be used—such for example as fiber strips, some forms of glass, and the like. But for purposes of simplicity in description these non-magnetic parts are shown and will be referred to as brass or copper.

Referring to Figs. 2 and 3 the non-magnetic strip which is designated by the numeral 37 is substantially the same shape as end plate 20 and has an extension thereon which corresponds in size to the extension 21 and serves to insulate the hinged ends of the magnetic sections and to receive the hinge pin; the correspondingly positioned non-magnetic strip in part 16, which is designated by the numeral 37', is a shorter insulating and filler strip, corresponding in shape to the part 34. Likewise the next strip in part 15 which is of magnetic material and is designated by the numeral 38 is associated with a corresponding magnetic strip 38' in the part 16 which has an extension thereon and which corresponds in shape to the main hinge or end plate 31 of the part 16, receiving the hinge pin in the same manner. The remaining thinner strips shown between the parts 30—30' and 33—33' are alternately strips having extensions for receiving the hinge pin and shorter cooperating filler strips which respectively correspond in shape and dimensions with parts 30 and 33.

In the modification shown in Figs. 4 and 5 the composite magnetic and non-magnetic strip hinged portions are designated respectively by the numerals 40 and 41, and they may be held frictionally in angularly adjusted position by tightening of the bolts upon the hinge pin as described above, however in order to insure greater rigidity in adjustment in this particular construction part 40 carries a pair of yokes 42 and 42' each of which is adjustably mounted upon a non-magnetic pin 43 while the part 41 carries a pair of corresponding yokes 44 and 44' each of which is also adjustably mounted on a non-magnetic pin 45. A pair of connecting or adjusting rods 46 and 46' are provided, each of which is threaded throughout its length, or for a sufficiently substantial distance from each of its opposite ends, and is of such dimensions as to pass freely through a corresponding passage in a pair of the yokes 42—42' and 44—44', a pair of adjusting nuts 47 and 47' being provided for one end of each connecting rod and a corresponding pair of adjusting nuts 48 and 48' being provided for the other end. By sufficiently reducing the frictional resistance between the strips or plates at the hinge pin the manner above described, and by suitably adjusting the positioning of the nuts 47—47' and 48—48', the rods 46 and 46' may be adjusted to desired angular setting and locked in place to provide a substantially rigid locking means to hold the two parts 40 and 41 in the proper angular setting with respect to each other, the rods 46—46' supplementing the holding effect of friction at the hinge pin. Each of the yokes 42—42' and 44—44' may be properly swung about its respective supporting pin 43—45 by loosening the nuts 50 and 51, which have corresponding nuts, 50' and 51', upon the other ends of said pins and the yokes 42—42' and 44—44' having been given the proper angular positioning to accommodate the rods 46—46', these yokes likewise may be locked in position by increasing the frictional resistance. The yokes 42—42' and 44—44' may be placed on their supporting pins and against the outside plates 20—20' and 34—34', or, as shown in Fig. 5 the composite magnetic and non-magnetic members 40—41 may be cut away each along one edge to receive the yoke members 42—42' and 44—44' so that they may be readily adjusted about their respective pins 43 and 45, and the dimensions may be such that the side edges of each yoke will be in frictional resistance with the two adjusted parts, when the whole device is tightened and in adjusted position.

Figure 8:
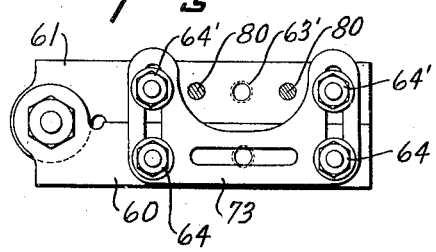
Fig. 8 is an end view of the adapter with the parts held in substantially parallel position by the locking means.

Figs. 6, 7 and 8 show a somewhat modified form of hinged device utilizing a different type of holding or locking member to hold the parts 60 and 61 in proper angular setting. In this form of construction the end plates 62 and 62' are provided with tapped holes, these holes being designated by the numerals 63 and 63'. Three of these holes are shown, and in Fig. 6 the two holes most distant from the hinge pin are not in use while the third hole in each member which is closest to the hinge pin receives a set screw or other locking bolt or screw the one for the parts 60 being designated by the numeral 64 and the one for the part 61 being designated by the numeral 64'. Each of these bolts 64—64' is proportioned respectively to fit into each of the tapped holes 63—63' and also to pass through each of the slots or openings 70, 71 and 72 in the somewhat U-shaped locking plate which is designated generally by the numeral 73, this plate having a longer body portion with two projections which are designated respectively 74 and 75. As shown in Fig. 6 the two angularly adjustable parts are positioned at right angles and the locking bolts 64 and 64' are positioned in the passages or slots 70 and 72, with the plate 73 so located that by proper tightening of these bolts the plate will assist in locking the parts in proper adjusted position. By reducing the frictional resistance at the hinge pin, and also by loosening the bolts 64 and 64' angular adjustment of the parts 60—61 with respect to each other may be attained within the range of movement permitted by the extent of the openings 70 and 72. Likewise by moving one or both of the holding bolts 64—64' to another of the tapped openings 63—63', additional angular adjustability of the parts may be attained and the parts securely locked in position.

Fig. 7 shows somewhat different positioning of the plate 73 in that the extension parts 74—75 extend in the opposite direction, and by proper manipulation of the holding bolts with respect to the positioning of the plates 73, and positioning these bolts in differently selected tapped holes 63—63' varying angular adjustment of the parts 60—61 may be secured.

In Fig. 8 the plate 73 is so positioned that both of the holding bolts 64—64' are positioned in the opening 72, and in the outside tapped holes 63—63' and when so positioned the two parts of the chuck adapter can be locked firmly together at a small degree angle or to give the equivalent of a flat adapter of double thickness. By suitable movement of its plates a wide and accurate angular adjustment of its parts may be secured and maintained, as desired. Also by the use of such plates the frictional resistance at the hinge pin need not be relied on as the openings in the holding plates present edges effective against the bolts 64—64', in any position of adjustment, so the holding plates will serve adequately to hold the parts in angular adjustment and will, in effect, constitute a rigid plate or wedging member for preventing accidental movement or slippage when the holding bolts are properly tightened. Also accurate angular setting is thus more readily and certainly attained as there is no rotary contact between the holding bolts or nuts and parts to be angularly adjusted which would tend to vary the angular setting after once selected, as might occur when the hinge pin nuts are rotatably tightened while against the angular parts in which arrangement greater care may be required to secure the desired fixed setting.

The various strips and end plates which make up the hinged parts of the adapter may be held together in any suitable manner. As shown they are held together by means of a plurality of non-magnetic rods the ends of which are peened or riveted over to hold them fast in place, and which pass through correspondingly alined holes in the various strips and with the strips of each part of the adapter held in such frictional resistance that each part acts substantially as a solid piece to give the desired rigidity during use. These non-magnetic cross holding pins are indicated by the numeral 80, and to readily differentiate them from the tapped holes 63 which also appear in each end plate they are double cross hatched, although not really seen in cross section.

While the apparatus as described represents preferred embodiments of the invention, it is to be understood that changes may be made therein without departure from the proper scope of the invention as disclosed and as defined in the appended claims.

What is claimed is:

1. A magnetic chuck adapter of the character described comprising flat body portions, each said body portion being composed of alternate sections of magnetic material and sections of non-magnetic insulating material, means connecting the two portions for permitting accurate angular adjustment of said portions into predetermined angularly adjusted relationship, a rod, spaced members pivotally connected to the end of each body member opposite the hinged end, each such members having an opening therein to receive said rod, and means threaded upon each said rod at each end to lock the rod and the pivoted members to hold the main body members in predetermined angular adjustment.

2. A magnetic chuck adapter comprising two main body portions, hinge means whereby said main body portions may be angularly adjusted with respect to each other, locking bolts, a plate member having holes therein to receive said locking bolts, each said main body portion having threaded bolt receiving openings, whereby the positioning of the plates on the bolts threadedly mounted within the openings in said plates may be varied to give desired angular positioning of the main body portions and the bolts tightened to lock the said hinged main body portions in said angular positioning, said plate and bolts in desired angular positionings giving a wedge action which holds said main portions against collapsing movement.

3. A magnetic chuck adapter comprising two main body portions, hinge means whereby said main body portions may be angularly adjusted with respect to each other, locking bolts, a plate member having holes therein to receive said locking bolts, each said main body portion having a plurality of threaded openings for said bolts whereby the positioning of the plates on the bolts threadedly mounted within the openings in said plates may be varied to give any desired angular positioning of the main body portions and the bolts tightened to lock the said hinged main body portions in said angular positioning, said plate and bolts in desired angular positionings giving a wedge action which holds said main portions against collapsing movement.

4. A magnetic chuck adapter comprising two main body portions, hinge means whereby said main body portions may be angularly adjusted with respect to each other, locking bolts, a plate member having holes therein to receive said locking bolts, each said main body portion having three threaded openings for said bolts each adapted to receive one of the bolts whereby the positioning of the plates on the bolts threadedly mounted within the openings in said plates may be varied to give any desired angular positioning of the main body portions and the bolts may be threaded into respectively selected holes and tightened to lock the said hinged main body portions in said angular positioning, said plate and bolts in desired angular positionings giving a wedge action which holds said main portions against collapsing movement.

5. A magnetic chuck adapter comprising two main body portions, hinge means whereby said main body portions may be angularly adjusted with respect to each other, locking bolts, a plate member having holes therein to receive said locking bolts, each said main body portion having a threaded opening for said bolts whereby the positioning of the plates on the bolts threadedly mounted within the openings in said plates may be varied to give any desired angular positioning of the main body portions and the bolts tightened to lock the said hinged main body portions in said angular positioning.

6. A magnetic chuck adapter comprising two main body portions, hinge means whereby said main body portions may be angularly adjusted with respect to each other, a substantially U-shaped plate member having three holes or openings therein arranged respectively in the side legs and along the back edge of the plate member, adjusting bolts, each said opening being adapted to receive one of said adjusting bolts, each said main body portion having a threaded opening for said bolts whereby the positioning of the plates on the bolts threadedly mounted within the openings in said plates may be varied to give any desired angular positioning of the main body portions and the bolts tightened to lock the said hinged main body portions in said angular positioning.

7. A magnetic chuck adapter having hinged body portions, each body portion comprising pairs of adjoining long and short lengths of magnetic material, lengths of non-magnetic material positioned between and separating adjacent said pairs of magnetic material, and non-magnetic means for hinging the body portions together with lengths of magnetic material of one body portion in firm contact with lengths of magnetic material of the other body portion.

8. A magnetic chuck adapter comprising a plurality of body portions each comprising alternate strips of magnetic material and strips of non-magnetic material, means providing a hinged connection between said body portions with magnetic strips of each body portion in direct contact with magnetic strips of the other body portion, and means for locking said body portions in predetermined angularly adjusted relationship about said hinged connection, said connection and said locking means being so constructed that relative adjustment and locking of said body portions may be effected without affecting the insulating effect of said non-magnetic strips with respect to said magnetic strips.

9. A magnetic chuck adapter comprising a plurality of body portions each comprising alternate strips of magnetic material and strips of non-magnetic material, magnetic strips of each body portion overlapping magnetic strips of the other body portion in superimposed relation and in direct contact therewith, non-magnetic hinge pintle means engaging in said overlapping magnetic strips to provide a hinged connection therebetween without affecting the magnetic flux within said magnetic strips, and means carried by said hinge pintle for bringing said overlapping magnetic strips into frictional locking contact, to hold said body portions in predetermined angular adjustment.

10. A magnetic chuck adapter comprising a plurality of body portions each comprising alternate strips of magnetic material and strips of non-magnetic material, means providing a hinged connection between said body portions with magnetic strips of each body portion in direct contact with magnetic strips of the other body portions and without short-circuiting the magnetic flux, and means connected to said body portions at positions removed from said hinged connection for effecting predetermined angular adjustment of said body portions and for locking said body portions in such adjustment without affecting the predetermined relationship of said magnetic and non-magnetic strips.

11. A magnetic chuck adapter comprising a plurality of body portions each comprising alternate strips of magnetic material and strips of non-magnetic material, magnetic strips of each body portion overlapping magnetic strips of the other body portion and in direct contact therewith, non-magnetic hinge pintle means engageing in said overlapping magnetic strips to provide a hinged connection therebetween without affecting the magnetic flux within said magnetic strips, and means cooperating with each body portion and adjustable to a plurality of positions with respect to each body portion for effecting predetermined angular relationship between said body portions and for locking said body portions in such predetermined angular relationship without affecting the predetermined relationship and said magnetic and non-magnetic strips.

12. A magnetic chuck adapter comprising two main body portions, each of said body portions comprising a plurality of pairs of adjoining lengths of magnetic material, each said pair comprising a long and a short length of magnetic material, a length of non-magnetic material positioned between and separating adjacent said pairs, each said pair being of substantially greater width than each said length of non-magnetic material whereby the magnetic portion of said body portion is substantially greater than the non-magnetic portion thereof, each of said long lengths of magnetic material being extended at one end to form an apertured ear portion, said ear portions of one of said body portions overlapping the corresponding ear portions of the other of said body portions and being in direct contact therewith, non-magnetic pintle means engaging in said apertured ears to provide a hinged connection between said body portions, and means for locking said body portions in predetermined angular relationship.

13. A magnetic chuck adapter comprising two main body portions, each of said body portions comprising a plurality of pairs of adjoining lengths of magnetic material, each said pair comprising a long and a short length of magnetic material, a length of non-magnetic material positioned between and separating adjacent said pairs, each said pair being of substantially greater width than each said length of non-magnetic material whereby the magnetic portion of said body portion is substantially greater than the non-magnetic portion thereof, each of said long lengths of magnetic material and each of said lengths of non-magnetic material being extended at one end to form an apertured ear portion, said ear portions of one of said body portions overlapping the corresponding ear portions of the other of said body portions and being in direct contact therewith, non-magnetic pintle means engaging in said apertured ears to provide a hinged connection between said body portions, and means for locking said body portions in predetermined angular relationship.

14. A magnetic chuck adapter comprising two main body portions, each of said body portions comprising a plurality of pairs of adjoining lengths of magnetic material, each said pair comprising a long and a short length of magnetic material, a length of non-magnetic material positioned between and separating adjacent said pairs, each said pair being of substantially greater width than each said length of non-magnetic material whereby the magnetic portion of said body portion is substantially greater than the non-magnetic portion thereof, each of said long lengths of magnetic material being extended at one end to form an apertured ear portion, said ear portions of one of said body portions overlapping the corresponding ear portions of the other of said body portions and being in direct contact therewith, non-magnetic pintle means engaging in said apertured ears to provide a hinged connection between said body portions, and means for locking said body portions in predetermined angular relationship, said last named means comprising a plate member having holes therein to receive locking bolts, each said main body portion having a plurality of threaded openings for said bolts whereby the positioning of the plates on the bolts threadedly mounted within the openings in said plates may be varied to give any desired angular positioning of the main body portions and the bolts tightened to lock the said hinged main body portions in said angular positioning, said plate and bolts in desired angular positionings giving a wedge action which holds said main portions against collapsing movement.

15. A magnetic chuck adapter comprising two main body portions, each of said body portions comprising a plurality of pairs of adjoining lengths of magnetic material, each said pair comprising a long and a short length of magnetic material, a length of non-magnetic material positioned between and separating adjacent said pairs, each said pair being of substantially greater width than each said length of non-magnetic material whereby the magnetic portion of said body portion is substantially greater than the non-magnetic portion thereof, each of said long lengths of magnetic material being extended at one end to form an apertured ear portion, said ear portions of one of said body portions overlapping the corresponding ear portions of the other of said body portions and being in direct contact therewith, non-magnetic pintle means engaging in said apertured ears to provide a hinged connection between said body portions, and means for locking said body portions in predetermined angular relationship, said last named means comprising a substantially U-shaped plate member having three holes or openings therein arranged respectively in the side legs and along the back edge of the plate member, each opening being adapted to receive an adjusting bolt, each said main body portion having a threaded opening for said bolts whereby the positioning of the plates on the bolts threadedly mounted within the openings in said plates may be varied to give any desired angular positioning of the main body portions and the bolts tightened to lock the said hinged main body portions in said angular positioning.

16. A magnetic chuck adapter comprising angularly adjustable body portions each including alternate strips of magnetic and non-magnetic material, said magnetic strips in each said body portion including extending portions at one end thereof arranged in overlapping and directly contacting paired relation with said extending end portions of magnetic strips in the other body portion, said non-magnetic strips in each said body portion including extending end portions positioned between and separating adjacent said pairs of contacting magnetic end portions, means providing a hinged connection between said overlapping end portions providing for relative angular adjustment of said body portions, locking bolts, and plate members cooperating with each said body portion and having openings therein to receive said locking bolts, said body portions each having therein a plurality of openings to receive said bolts with said plates variably positioned on said bolts and said bolts variably positioned in said respective holes to lock said body portions in predetermined angular relationship.

17. A magnetic chuck adapter comprising a pair of body portions each comprising alternating sections of magnetic and non-magnetic material, said magnetic sections being of greater width than said non-magnetic sections, said magnetic sections composing a materially greater part of said body portions than said non-magnetic sections and each having at one end thereof an extending portion of substantially lesser width than the remainder thereof, said extending ends of said magnetic sections on one body portion being arranged in overlapping and directly contacting paired relation with the corresponding extending ends of said magnetic sections of said other body portion, said non-magnetic sections in each said body portion having extending ends positioned in alternating relation with and separating said contacting pairs of magnetic end portions, and means pivotally connecting said overlapping end portions.

ALOYSIUS B. LUTHER.

REFERENCES CITED

The following references are of record in the file of this patent:

UNITED STATES PATENTS

| Number | Name | Date |
|---|---|---|
| 130,036 | Hagerty | July 30, 1872 |
| 595,607 | Coykendall | Dec. 14, 1897 |
| 1,082,210 | Pace | Dec. 23, 1913 |
| 1,174,887 | Meriwether | Mar. 7, 1916 |
| 1,534,865 | Owens | Apr. 21, 1925 |
| 1,551,995 | Lovenston | Sep. 1, 1925 |
| 1,772,126 | Barry | Aug. 5, 1930 |
| 2,014,156 | Verderber | Sep. 10, 1935 |
| 2,113,874 | Chanik | Apr. 12, 1938 |